July 21, 1931.  H. B. SMITH  1,815,122
MEANS FOR TRAPPING INSECTS
Filed Sept. 5, 1929
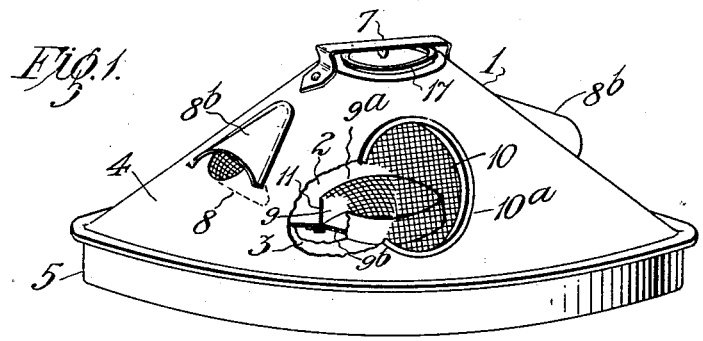
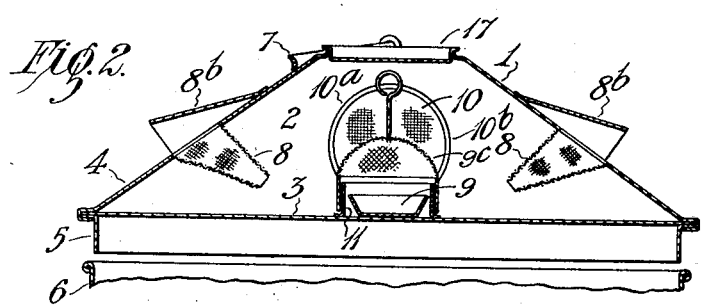
H. B. Smith
INVENTOR
By: Marks & Clerk
Attys.

Patented July 21, 1931

1,815,122

UNITED STATES PATENT OFFICE

HERBERT BLACKFORD SMITH, OF MURRUMBEENA, VICTORIA, AUSTRALIA, ASSIGNOR OF ONE-THIRD TO JOSEPH BARTLETT SPLATT AND ONE-THIRD TO WILLIAM DUDLEY TAYLOR, BOTH OF VICTORIA, AUSTRALIA

MEANS FOR TRAPPING INSECTS

Application filed September 5, 1929. Serial No. 390,569, and in Australia February 12, 1929.

An object of this invention is to provide means to trap blow flies and other insects which are attracted to or approach near to a garbage can, food safe, or like article—each hereinafter called a container, for brevity. Such containers give off odours which attract insects, their activities being objectionable, as they do damage and foster disease.

A further object of the invention is to keep the immediate vicinity of the containers free or comparatively free from the presence of these insects so that when the lids or doors are opened they will not be at hand ready for entry to the food or other contents. Further the invention enables the outer surfaces of containers to be kept free, or largely so, from insect contamination. As many places exist, in or near living apartments, where insect attracting containers are kept, the use of this invention will reduce unpleasantness to local people. Other objects of the invention will be apparent from the remainder of this specification.

My invention involves a combination with a container of the kind stated of an insect trapping cover or door, and this combination is further advantageous in places where space is limited, as the container body acts as a supporter for the trap which need not be conspicuous. The combination is, I believe, broadly new and it will be evident from the following that its application can take various forms.

Each container cover and trap is of any suitable size, shape, and material, hinged on or wholly removable. In the drawings herewith, I illustrate my invention applied to a garbage tin cover, but other applications can obviously be made, and modified details may be adopted while retaining the matter in my claim.

Figure 1 is a perspective view of an insect trapping cover of an odour yielding container—parts are shown broken out to exhibit the interior.

Figure 2 is a central vertical section of a cover in Figure 1, modified, and shown above a container top.

For brevity the term "flies" hereinafter will refer to all insects to be trapped; and the term "cover" to any movable lid or door fitted with trapping means according to this invention.

In these drawings 1 is a cover having one or more trapping chambers, one marked 2 being shown between a bottom 3 and a top 4. The cover has means—in this instance a circular flange 5—to enable it to close a container shown as a garbage tin 6. The cover need not have a handle or handles, and the position and kind thereof if used are optional, one being shown marked 7. The cover outer surface is of any suitable shape, shown somewhat conical in Figures 1 and 2, but domed in Figure 3. Any suitable means are used for the entrance of insects and to prevent their escape, 8 indicating a funnel of any suitable shape and size, which is easier to clean and sterilize when, as illustrated in Figures 3 and 4, it is removable.

Insect attracting odours will from time to time at will be caused to emanate from the cover. Thus within the cover at 9 I set bait or some luring substance.

Odours from the container pass into the atmosphere, some direct, and some will pass when predetermined through the cover. These odours ordinarily will suffice as a lure.

Figure 1 shows two insect inlets 8, with hoods 8$^b$ which facilitate the entries desired.

The cover has means to admit light to its interior shown by a screen or window 10, and dead insects, and other matter if present can be readily emptied out or removed. Light is thus admitted at any suitable part or parts, and the window is removable. It has a rim 10$^a$ fitting a socket 10$^b$ on the cover. It can be covered by an opaque member, in this case a disc of circular form,—at will, as when flies are not prevalent, or to protect the screen when it is of gauze. Instead of a removable window insect proof holes 10$^c$ are usable. The lure holder 9 is shown in a cage formed by a cap 9$^a$ of wire mesh fixed on a flange 11, entry to the cage being through a base opening closed by a removable—downwardly for example—flanged member 9$^b$. Or the base is closed as in Figure 2 and cage cap 9$^c$ is removable through top cap 17 through window 10. Flange 11 rises from the bottom 3, so that if water enters chamber 2 the flange prevents it entering container 6. But this detail is not necessarily provided.

Most insects entering the trap die there, and in the case of Figures 1 and 2 can be emptied out by inverting the cover, and removing either the window 10 or a top cap 17, a convenient form of which is circular. The cover acts, it will be observed, as a trap not only when on the container, but also when only partly on, and even when quite off it.

It is obviously easy to sterilize the cover with hot water and/or disinfectant; or by burning paper (for example) within it.

In the claims the term "odour yielding container" is for brevity used to refer to a new or other garbage can, food container, and similar articles.

I claim:—

A device of the character described comprising a base, a truncated cone-shaped casing connected with the base and terminating in a depending annular flange, the upper part of the casing having an opening, a flanged cover detachably engaged in said opening, said casing having a series of inlet openings, inwardly and downwardly directed funnels secured to the inner surface of the casing about the inlet openings, hoods connected to the outer surface of the casing above the inlet openings, and a lure holder mounted on the upper surface of the base and within the casing.

In witness whereof I have hereunto signed my name to this specification at Melbourne, in the State of Victoria, in Australia, this seventh day of August, 1929.

HERBERT BLACKFORD SMITH.